US 10,767,726 B2

(12) United States Patent
Verhoog et al.

(10) Patent No.: US 10,767,726 B2
(45) Date of Patent: Sep. 8, 2020

(54) PENDULUM DAMPING DEVICE

(71) Applicant: VALEO EMBRAYAGES, Amiens (FR)

(72) Inventors: Roel Verhoog, Gournay sur Aronde (FR); Franck Cailleret, Amiens (FR)

(73) Assignee: VALEO EMBRAYAGES, Amiens (FR)

(*) Notice: Subject to any disclaimer, the term of this patent is extended or adjusted under 35 U.S.C. 154(b) by 123 days.

(21) Appl. No.: 15/778,853

(22) PCT Filed: Nov. 24, 2016

(86) PCT No.: PCT/EP2016/078633
§ 371 (c)(1),
(2) Date: May 24, 2018

(87) PCT Pub. No.: WO2017/089442
PCT Pub. Date: Jun. 1, 2017

(65) Prior Publication Data
US 2018/0355950 A1 Dec. 13, 2018

(30) Foreign Application Priority Data
Nov. 25, 2015 (FR) ...................................... 15 61331

(51) Int. Cl.
*F16F 15/14* (2006.01)
*F16F 15/31* (2006.01)
*F16H 45/02* (2006.01)

(52) U.S. Cl.
CPC ............ *F16F 15/145* (2013.01); *F16F 15/31* (2013.01); *F16H 2045/0263* (2013.01)

(58) Field of Classification Search
CPC .. F16F 15/145; F16F 15/31; F16H 2045/0263
See application file for complete search history.

(56) References Cited

U.S. PATENT DOCUMENTS 2,814,187 A * 11/1957 Babaian .................... F16D 3/56
464/84
6,067,876 A * 5/2000 Lohaus ................. F16F 15/145
74/574.4

(Continued)

FOREIGN PATENT DOCUMENTS

DE          199 54 274 A1      5/2001
EP            2607743 A1  *    6/2013
WO       WO 2013/156733 A1    10/2013

OTHER PUBLICATIONS

EPO Machine Translation of EP2607743 A1, Verhoog et al., Jun. 26, 2013 (Year: 2013).*

(Continued)

*Primary Examiner* — Vinh Luong
(74) *Attorney, Agent, or Firm* — Oblon, McClelland, Maier & Neustadt, L.L.P.

(57) ABSTRACT

A pendulum damping device including a mounting to rotate about an axis; at least one pendulum body that includes first and second pendulum masses axially spaced relative to each other and movable relative to the mounting, the first pendulum mass being axially placed on a first side of the mounting and the second pendulum mass being axially placed on a second side of the mounting, and at least one member to connect the first and second pendulum masses and couple the masses; and at least one rolling member that guides the movement of the pendulum body relative to the mounting. The rolling member engages with a rolling track secured to the mounting and with a rolling track secured to the pendulum body and defined by the connecting member. The rolling member exerts an axial clamping force on one of the pendulum masses during movement of the one pendulum mass relative to the mounting.

9 Claims, 3 Drawing Sheets

(56) References Cited

U.S. PATENT DOCUMENTS

| | | | | |
|---|---|---|---|---|
| 6,109,134 | A * | 8/2000 | Sudau | F16F 15/13157 |
| | | | | 192/207 |
| 2012/0222515 | A1 * | 9/2012 | Kinoshita | F16F 15/145 |
| | | | | 74/572.2 |
| 2015/0053519 | A1 * | 2/2015 | Ray | F16F 7/10 |
| | | | | 188/378 |
| 2015/0075320 | A1 | 3/2015 | Verhoog | |
| 2016/0195164 | A1 * | 7/2016 | Verhoog | F16F 15/145 |
| | | | | 74/574.2 |
| 2016/0273613 | A1 * | 9/2016 | Verhoog | F16F 15/145 |
| 2019/0170211 | A1 * | 6/2019 | Bouche | F16F 15/145 |

OTHER PUBLICATIONS

Define lug—Google Search, Feb. 9, 2020 (Year: 2020).*
Define pendular motion, Google Search, Mar. 19, 2020. (Year: 2020).*
International Search Report dated Feb. 9, 2017 in PCT/EP2016/078633 filed Nov. 24, 2016.
Office Action dated Mar. 24, 2020, in corresponding Japanese Patent Application No. 2018-526837 with English translation.

* cited by examiner

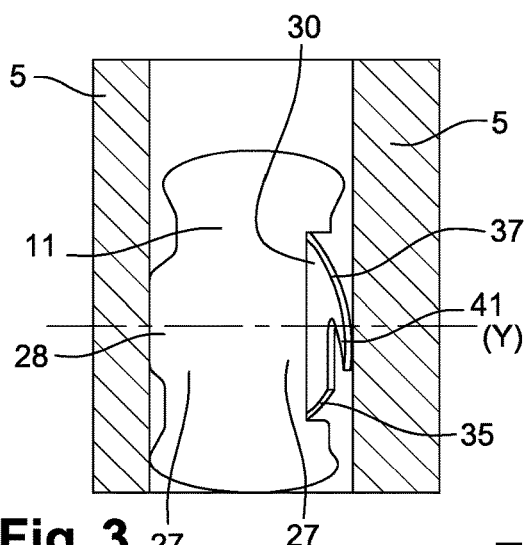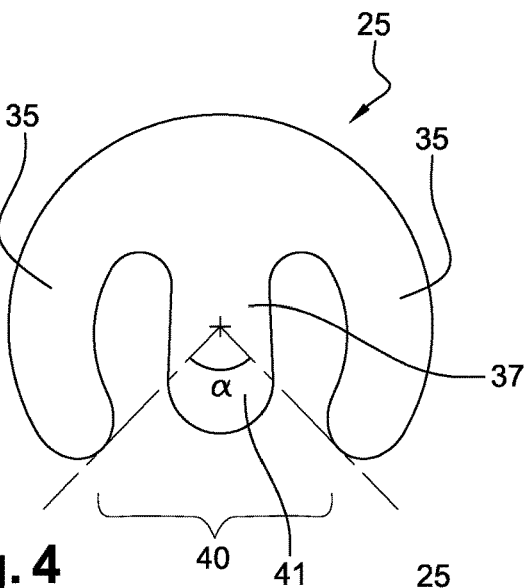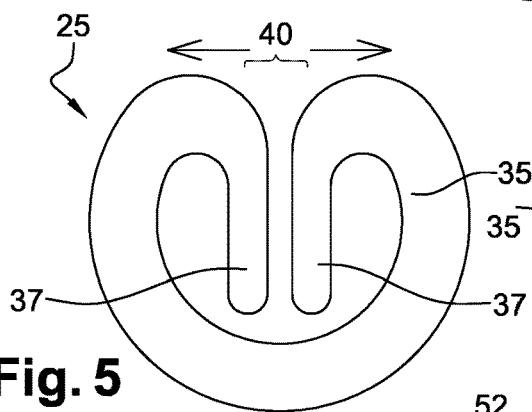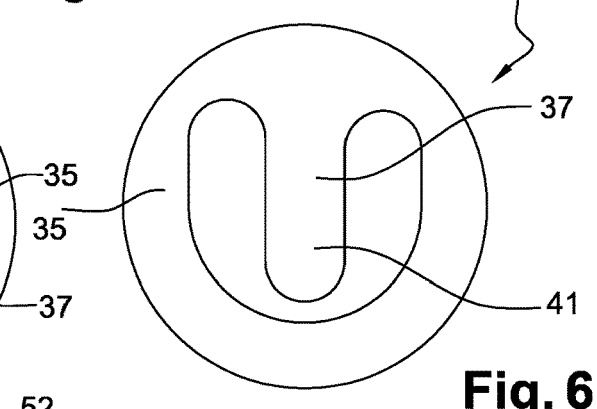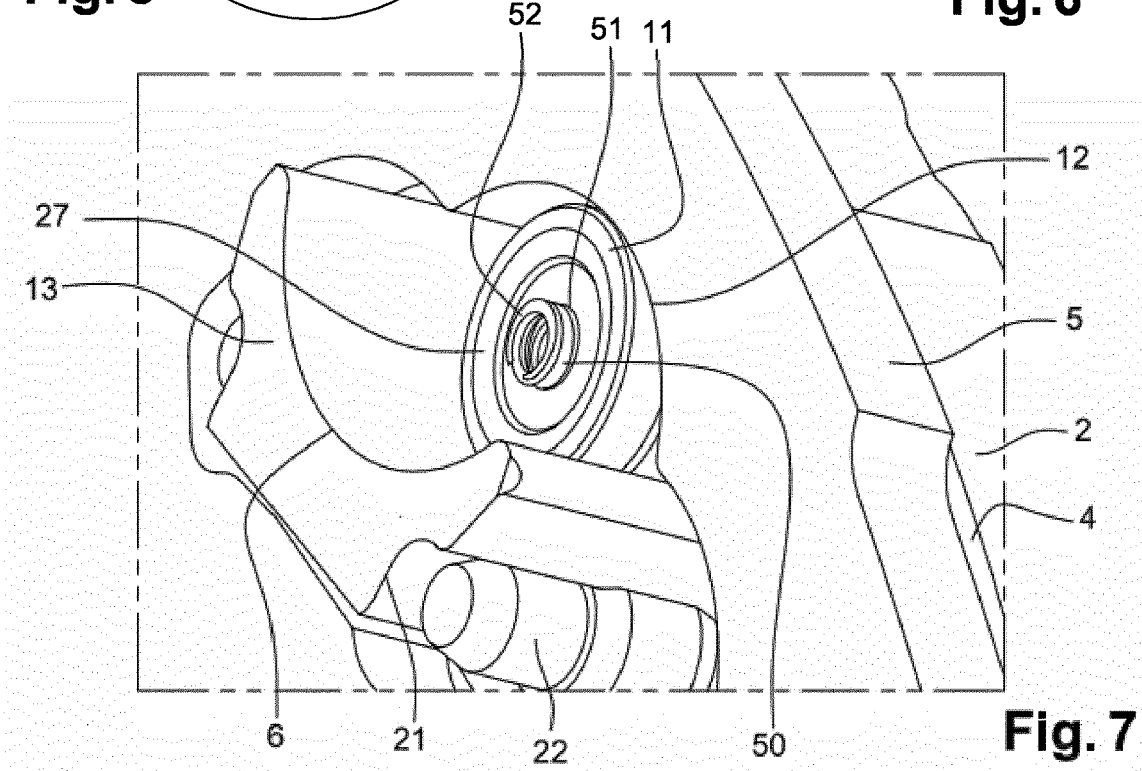

PENDULUM DAMPING DEVICE

FIELD OF INVENTION

The present invention relates to a pendular damping device, in particular for a motor vehicle transmission system.

BACKGROUND

In such an application, the pendular damping device can be incorporated in a torsion damping system of a clutch capable of selectively linking the heat engine to the gearbox, in order to filter the vibrations due to the acyclisms of the engine. Such a torsion damping system is for example known as double damping flywheel.

As a variant, in such an application, the pendular damping device can be incorporated in a friction disk of the clutch or in a hydrodynamic torque converter.

Such a pendular damping device conventionally implements a support and one or more pendular bodies that are mobile relative to this support, the movement relative to the support of each pendular body being guided by two rolling members cooperating on the one hand with rolling tracks integral to the support, and on the other hand with rolling tracks integral to the pendular bodies. Each pendular body for example comprises two pendular masses riveted together.

It is known practice to choose the damping device, for example via the form of the rolling tracks, such that the latter filters the order of excitation of a two-cylinder heat engine of the vehicle, also called "order 1", the order of excitation of a heat engine being, as is known, the number of explosions of this engine per crankshaft revolution. Such devices are highly sensitive to the force of gravity, the latter then being able to cause undesirable movements of the pendular bodies, and therefore affect the filtering efficiency.

To remedy this problem, it is for example known from the application DE 10 2012 221 103 to provide springs between two circumferentially adjacent pendular bodies, such that the duly linked pendular bodies withstand the force of gravity exerted revolution by revolution on the latter when the device is driven by a rotational movement. The insertion of these springs presupposes forming additional housings in the pendular bodies or providing appropriate fixing means on these pendular bodies, which is costly and complex. Because of the insertion of the springs, an additional resonance frequency also appears. The insertion of the springs may even require forming open cutouts in the support of the device, then reducing the travel of the pendular bodies. Furthermore, it is necessary to correctly dimension the springs and the maintenance over time of the characteristics of the springs is not guaranteed.

SUMMARY

The object of the invention is to reduce the influence of gravity on the pendular bodies, particularly when the aim of the latter is to filter the order of excitation of a two-cylinder heat engine of the vehicle, while remedying all or some of the above drawbacks.

The invention aims to address this need, and it achieves this, according to one of its aspects, using a pendular damping device, comprising:

a support capable of moving rotationally about an axis, at least one pendular body comprising: a first and a second pendular mass spaced apart axially relative to one another and mobile relative to the support, the first pendular mass being arranged axially on a first side of the support and the second pendular mass being arranged axially on a second side of the support, and at least one member linking the first and the second pendular masses pairing said masses, and at least one rolling member guiding the movement of the pendular body relative to the support, the rolling member cooperating on the one hand with a rolling track integral to the support and on the other hand with a rolling track integral to the pendular body and defined by the link member, the rolling member exerting an axial gripping force on at least one of the pendular masses during the movement thereof relative to the support.

According to the invention, the axial gripping exerted by the rolling member on the pendular mass, and therefore on the pendular body, opposes the movement of this pendular body under the effect of gravity and therefore impedes the action of gravity on this pendular body. When the support rotates, each pendular body in turn occupies the highest position about the axis of rotation of the support. The downward movement of the highest pendular body is thus reduced by the rolling member which exerts an axial gripping on this pendular body.

Within the meaning of the present application:

"axially" means "parallel to the axis of rotation of the support" or "parallel to the longitudinal axis of the rolling member", depending on the case, "radially" means "along an axis belonging to a plane orthogonal to the axis of rotation of the support and intersecting this axis of rotation of the support", "angularly" or "circumferentially" means "about the axis of rotation of the support", "orthoradially" means "at right angles to a radial direction", "integral" means "rigidly coupled", and the rest position of the device is that in which the pendular bodies are subjected to a centrifugal force, but not to torsional oscillations originating from the acyclisms of the heat engine.

The rolling member can exert an axial gripping force on just one of the pendular masses of the pendular body, during the movement of this pendular body relative to the support.

As a variant, the rolling member can exert an axial gripping force on each pendular mass of the pendular body during the movement of the pendular body relative to the support. Thus, the action exerted by the rolling member on the pendular body is reinforced to impede the action of gravity on this pendular body.

According to a first exemplary implementation of the invention, the rolling member bears, on at least one of its axial end faces, an axial-bearing elastic element exerting an axial gripping on the pendular mass. This axial gripping can be exerted over all the amplitude of the movement of the pendular body relative to the support. According to this first example, a washer can be mounted on the axial end face of the rolling member and the axial-bearing elastic element can be formed by at least one lug of this washer. In this case, the washer is received in the axial end face of the rolling member facing the pendular mass that is thus axially gripped. The washer is for example fixed onto the rolling member.

In the case where the rolling member axially grips only one pendular mass of the pendular body, this rolling member can have an axial end face of a form different from that of its other axial end face, this difference of form being due to the accommodation of the washer on only one of these axial end faces. The other axial end face does not then come into contact with the other pendular mass of the pendular body.

In the case where the rolling member axially grips each pendular mass of the pendular body, this rolling member can bear two distinct washers, each washer being mounted on an axial end face of the rolling member and axially gripping, via its lug, the pendular mass of the pendular body which is axially facing this axial end face.

In the case where the rolling member axially grips each pendular mass of the pendular body, this rolling member can have a first axial end face accommodating a washer axially gripping, via its lug, the pendular mass of the pendular body which is axially facing this first face, and a second axial end face bearing a protuberance coming into contact with the pendular mass of the pendular body which is axially facing this second axial end face, so as to axially grip this pendular mass.

According to this first example, the washer can be elastically deformable, so as to allow it to be fitted in a housing formed in the axial end face of the rolling member. This elastic deformation of the washer can be done in a plane at right angles to the axis of rotation of the rolling member, when the washer is fitted in the housing.

The washer is for example produced in spring alloy steel.

According to this first example, the washer can comprise:
a radially outer annular portion extending circumferentially, and
the lug extending from the radially outer annular portion toward the interior of the washer.

The lug can protrude axially relative to the radially outer annular portion of the washer, at least before the placement of the washer on the axial end face of the rolling member.

The radially outer annular portion can extend continuously, that is to say form an uninterrupted ring. It can be a Belleville washer.

As a variant, the radially outer annular portion of the washer can extend discontinuously, being slotted. The slot can have a variable circumferential extent. The slot extends for example over an angle measured between its two ends from the center of the outer annular portion of the washer which lies between 10° and 120°, in particular lying between 40° and 90°, more particularly lying between 50° and 70°.

When such a slot exists, the lug of the washer can be substantially rectilinear and have its free end facing the slot.

As a variant, when such a slot exists, two distinct lugs can be defined by the washer. The slot extends for example between two returns extending toward the interior of the washer from its radially outer annular portion, and each return forms a lug.

According to a second exemplary implementation of the invention, the rolling member is hollow so as to define a housing in which a spring is received, at least one of the ends of this spring forming the axial-bearing elastic element. This housing can be blind. One of the ends of the spring can be fixed onto the bottom wall of this blind housing while the other end of the spring protrudes out of the housing and bears axially on one of the pendular masses, so as to exert the abovementioned axial gripping.

In the case where the axial gripping is exerted by the rolling member on only one of the pendular masses of the pendular body, only one blind housing can be formed in the rolling member and only one spring is thus received in the rolling member.

In the case where the rolling member exerts an axial gripping on each pendular mass of the pendular body, two blind housings not communicating with one another can be formed in the rolling member. Each blind housing can then receive one spring having one end fixed onto the bottom wall of this blind housing and another end protruding out of this housing and bearing axially on one of the pendular masses, so as to exert the abovementioned axial gripping.

In a variant of the case in which the rolling member exerts an axial gripping on each pendular mass, the housing formed in the rolling member can be a through-housing, such that each end of the spring received in this housing forms an axial-bearing elastic element bearing axially on one of the respective pendular masses of the pendular body.

Features that can equally be applied to one of the abovementioned exemplary implementations will now be mentioned.

Each rolling member can cooperate with the rolling track integral to the support and with the rolling track or tracks integral to the pendular body only via its outer surface. Thus, a same portion of this outer surface can roll alternatively on the rolling track integral to the support and on a rolling track integral to the pendular body when the rolling member moves.

Each rolling member is for example a roller of circular section in a plane at right angles to the axis of rotation of the support. This roller can comprise several successive cylindrical portions of different radius. The axial ends of the roller can be without any thin annular flange. The roller is for example produced in steel. The roller can be hollow or solid.

The form of the first and second rolling tracks can be such that each pendular body is only moved relative to the support in translation about a hypothetical axis parallel to the axis of rotation of the support.

As a variant, the form of the rolling tracks can be such that each pendular body is displaced relative to the support both:
in translation about a hypothetical axis parallel to the axis of rotation of the support and,
also in rotation about the center of gravity of said pendular body, such a movement being also called "combined movement" and disclosed for example in the application DE 10 2011 086 532.

The device comprises, for example, a number of between two and eight, notably three or six, pendular bodies.

All these pendular bodies can follow one another circumferentially. The device can thus comprise a plurality of planes at right angles to the axis of rotation in each of which all the pendular bodies are arranged.

In all the above, the support can be produced from a single piece, being, for example, entirely metallic.

As mentioned previously, the rolling track integral to the pendular body is, here, defined by the link member of this pendular body. A portion of the outline of this link member defines, for example, the second rolling track. As a variant, a coating can be deposited on this portion of the outline of the link member to form the second rolling track.

Such a link member is for example force fitted via each of its axial ends into an opening formed in one of the pendular masses. As a variant, the link member can be welded or screwed via its axial ends onto each pendular mass.

Each pendular body comprises, for example, two link members pairing each pendular mass of this body, each link member being integral to each of these pendular masses. Each rolling member can then be only stressed in compression between the first and second rolling tracks mentioned above. These first and second rolling tracks cooperating with one and the same rolling member can be at least partly radially facing, that is to say that there are planes at right angles to the axis of rotation in which these rolling tracks both extend.

Each rolling member can be received in a window of the support not receiving any other rolling member. This window is, for example, defined by a closed outline of which a portion of the edge defines the rolling track integral to the support and cooperating with this rolling member.

The movement of each pendular body relative to the support can be guided by at least two rolling members, in particular precisely two rolling members. In this case, each rolling member exerts an axial gripping on at least one of the pendular masses of the pendular body. For example, each rolling member exerts only an axial gripping on the first pendular mass of the pendular body, without exerting axial gripping on the second pendular mass of the pendular body. As a variant, each rolling member exerts an axial gripping on each of the pendular masses of the pendular body. As another variant, only one of the rolling members guiding the movement of the pendular body exerts an axial gripping on the pendular mass or masses of this pendular body.

Each rolling member exerts, for example on the pendular body with which it interacts, an axial gripping of 0.5 N. The overall gripping force, expressed in Newtons, exerted by all the rolling members guiding the movement of a pendular body relative to the support can lie between 20% and 110% of the weight, expressed in Newtons, of this pendular body. Preferably, this gripping force lies between 50% and 90% of the weight of the pendular body, in particular lying between 60% and 80% of this weight.

In all the above, the device can comprise at least one interposition part of which at least a part is axially arranged between the support and a pendular mass of the pendular body. The interposition part is for example fixed onto a pendular mass or the support or formed by a coating deposited on a pendular mass or on the support. Such an interposition part can thus limit the axial movement of the pendular body relative to the support, thus avoiding the axial impacts between said parts, and thus undesirable wear and noise, in particular when the support and/or the pendular mass are made of metal. Several interposition parts, for example in the form of bearing pads, can be provided. The interposition parts are in particular produced from a damping material, such as plastic or rubber.

The interposition parts are for example borne by the pendular bodies, being in particular fixed onto the pendular bodies. The interposition parts can be positioned on a pendular body in such a way that there is always at least one interposition part of which at least a part is axially interposed between a pendular mass and the support, whatever the relative positions of the support and of said mass in the movement relative to the support of the pendular body.

In all the above, each pendular body can comprise at least one abutment damping member acting against the support. Each of these abutment damping members can then come into contact with the support to dampen the abutment of the pendular body against the latter, for example:
- at the end of a movement in the counter-clockwise direction of this pendular body from the rest position to filter a torsional oscillation, and/or
- at the end of a movement in the clockwise direction of this pendular body from the rest position to filter a torsional oscillation, and/or
- in the event of radial dropping of the pendular body, for example when the heat engine of the vehicle is stopped.

If appropriate, each abutment damping member can damp the abutment of the pendular body against the support at the end of a movement in the counter-clockwise direction from the rest position, at the end of a movement in the clockwise direction from the rest position, but also in the case of an radial dropping of the pendular body. Such an abutment damping member can thus be associated with a pendular body to damp all the abovementioned contacts between the pendular body and the support.

Each abutment damping member can be dedicated to a link member of the pendular body and borne by the latter. Each abutment damping member can then have a cylindrical form of axis parallel to the axis of rotation of the support.

Each abutment damping member can have elastic properties making it possible to damp impacts linked to the contact between the support and the pendular body. This damping is then permitted by a compression of the abutment damping member. The abutment damping member is for example made of elastomer or of rubber.

Another subject of the invention, according to another of its aspects, is a component for a transmission system of a motor vehicle, the component being in particular a double damping flywheel, a hydrodynamic torque converter, a flywheel integral to the crankshaft, a dry or wet double clutch, a wet single clutch, a hybrid power train component or a clutch friction disk, comprising a pendular damping device as defined above.

The support of the pendular damping device can then be one out of:
- a web of the component,
- a guiding washer of the component,
- a phasing washer of the component, or
- a support distinct from said web, from said guiding washer and from said phasing washer.

Yet another subject of the invention, according to another of its aspects, is a vehicle power train comprising:
- a heat engine propelling the vehicle, particularly with two, three or four cylinders, and
- a component for a transmission system as defined above.

BRIEF DESCRIPTION OF THE DRAWINGS

The invention will be able to be better understood on reading the following description of a nonlimiting exemplary implementation thereof and on studying the attached drawing in which:

FIG. 3 is a cross-sectional view along III-III of FIG. 2, FIGS. 4 to 6 schematically represent three variants of washer relative to that represented in FIG. 2, FIG. 7 represents, like FIG. 2, partially, a second exemplary implementation of the invention, when the device is at rest.

DETAILED DESCRIPTION

Figures 1, 2:
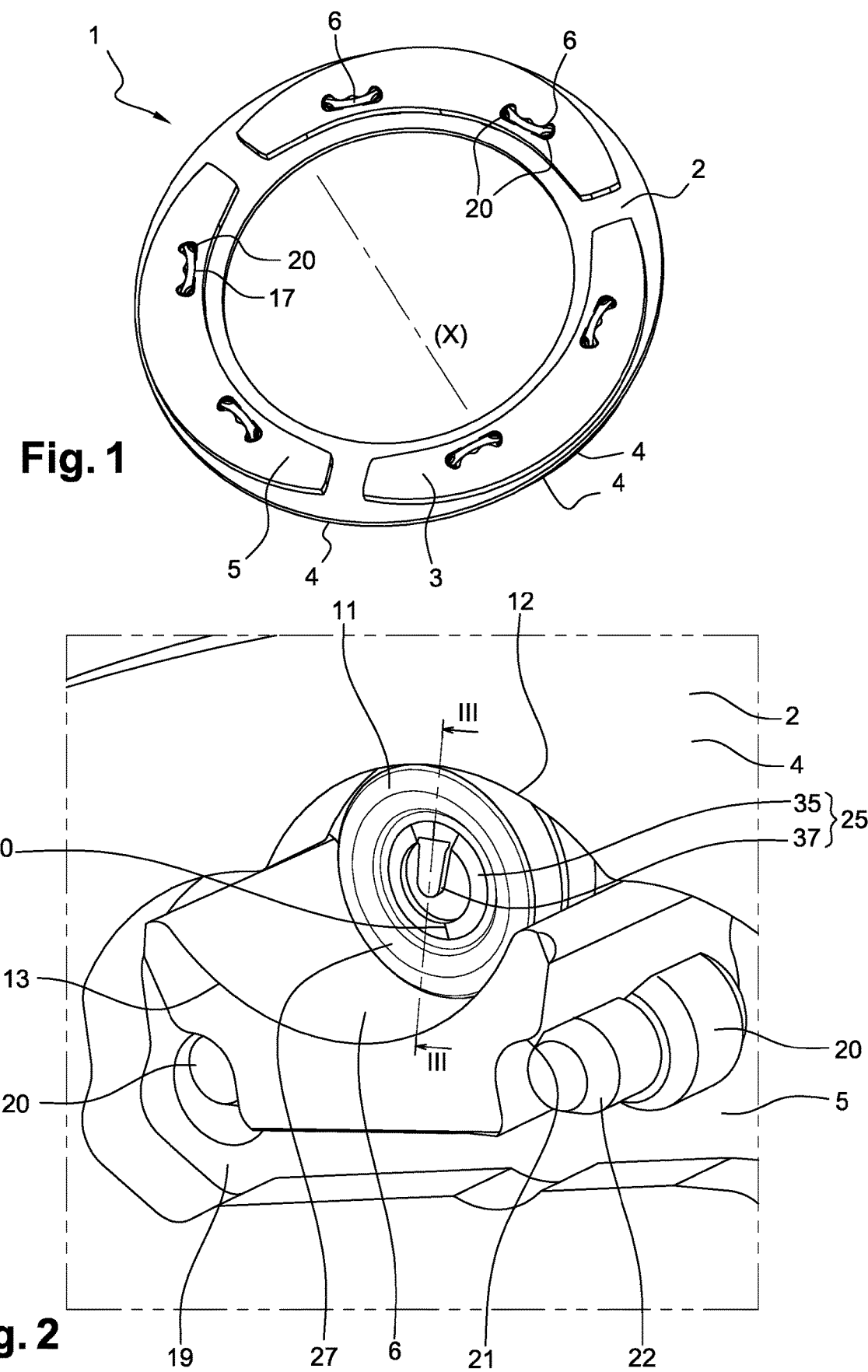
FIG. 1 schematically represents a pendular damping device according to an exemplary implementation of the invention, FIG. 2 partially a first exemplary implementation of the invention, when the device is at rest.

FIG. 1 shows a pendular damping device 1.

The damping device 1 is of pendular oscillator type. The device 1 is in particular capable of equipping a motor vehicle transmission system, being for example incorporated in a component not represented of such a transmission system, this component for example being a double damping flywheel, a hydrodynamic torque converter or a clutch friction disk.

This component can form part of a power train of a motor vehicle, this power train comprising a heat engine, in particular with two, three or four cylinders.

In FIG. 1, the device 1 is at rest, that is to say it does not filter the torsional oscillations transmitted by the power train because of the acyclisms of the heat engine.

As is known, such a component can comprise a torsion damper having at least one input element, at least one output element, and circumferentially-acting elastic return members which are interposed between said input and output elements. Within the meaning of the present application, the terms "input" and "output" are defined in relation to the direction of transmission of the torque from the heat engine of the vehicle to the wheels thereof.

The device 1 comprises, in the example considered:
- a support 2 capable of moving rotationally about an axis X, and
- a plurality of pendular bodies 3 that are mobile relative to the support 2.

According to the exemplary implementations of the invention which will be described later, the support 2 is singular. It can also be seen in FIG. 1 that three pendular bodies 3 are provided, being distributed evenly around the perimeter of the axis X.

The support 2 of the damping device 1 can be composed of:
- an input element of the torsion damper,
- an output element,
- an intermediate phasing element arranged between two series of springs of the damper, or
- an element linked in rotation to one of the abovementioned elements and distinct from the latter, then being, for example, a support specific to the device 1.

The support 2 is in particular a guiding washer or a phasing washer. The support can also be something else, for example a flange of the component.

In the example considered, the support 2 overall takes the form of a ring comprising two opposite sides 4 which here are flat faces.

As can be seen in particular in FIG. 1, each pendular body 3 comprises, in the example considered:
- two pendular masses 5, each pendular mass 5 extending axially facing one side 4 of the support 2, and
- two link members 6 securing the two pendular masses 5.

In FIGS. 2 and 7, one of the pendular masses 5 is not represented, so as to better see the support 2. In FIG. 3, the support 2 is not represented whereas the two pendular masses 5 of the pendular body 3 are.

The link members 6, also called "spacers", are, in the example considered, staggered angularly.

In the example of FIG. 1, each link member 6 is secured to the pendular masses 5 by being force-fitted via each of its ends into an opening 17 formed in one of the pendular masses 5. In variants that are not represented, each link member 6 can be screwed onto each pendular mass 5, or each end of a link member 6 is secured to one of the pendular masses 5 by welding.

The device 1 also comprises rolling members 11 guiding the movement of the pendular bodies 3 relative to the support 2. The rolling members 11 are, here, rollers having or not having several different successive diameters. Each rolling member 11 thus has a longitudinal axis Y parallel to the axis of rotation X of the support 2.

In the example described, the movement relative to the support 2 of each pendular body 3 is guided by two rolling members 11.

Each rolling member 11 is received in a window 19 formed in the support 2. In the examples considered, each window 19 receives only one rolling member 11.

Each rolling member cooperates on the one hand with a rolling track 12 integral to the support 2 and which, here, is formed by a portion of the edge of the window 19, and on the other hand with a rolling track 13 integral to the pendular body 3 and defined by a portion of the radially outer edge of the link member 6.

The device 1 also comprises abutment damping members 20 which are visible in FIGS. 2 and 7. Each link member 6 is, in the examples described, associated with two distinct abutment damping members 20. Each of these abutment damping members 20 here has an elongate form along an axis parallel to the axis Y. Each abutment damping member 20 is, here, received in a setback 21 formed in a lateral edge of the link member 6. Each abutment damping member 20 extends between two ends 22, each of these ends 22 being received securely in a housing that is not represented of the pendular mass 5 axially facing this end 22, so as to secure the abutment damping member 20 to the pendular body 3.

One of the abutment damping members 20 is positioned so as to damp the impacts associated with the abutment of the pendular body 3 against the support 2 at the end of a movement in the counter-clockwise direction from the rest position of FIGS. 2 and 7 to filter a torsional oscillation. The other abutment damping member 20 is positioned so as to damp the impacts associated with the abutment of the pendular body 3 against the support 2 at the end of a movement in the clockwise direction from the rest position of FIGS. 2 and 7 to filter a torsional oscillation.

Each abutment damping member 20 is, in the example considered, produced in rubber.

In variants, the abutment damping members can be something else. Two abutment damping members 20 associated with one and the same link member 6 can thus be linked to one another by a material bridge. As a variant, a single abutment damping member is associated with one and the same link member 6, this single abutment damping member damping the impacts between the pendular body 3 and the support 2:
- at the end of a movement in the counter-clockwise direction of this pendular body 3 from the rest position to filter a torsional oscillation, and
- at the end of a movement in the clockwise direction of this pendular body from the rest position to filter a torsional oscillation, and
- at the end of a radial drop of the pendular body, for example when the heat engine of the vehicle is stopped.

There now follows a description more specifically referred to FIGS. 2 to 7 of two exemplary implementations of the invention allowing for an axial gripping to be exerted on each pendular body 3 in order to impede the action of gravity on this pendular body 3.

In the exemplary implementations which will be described, the axial gripping is exerted on each pendular body 3 of the device 1 by the two rolling members 11 guiding the movement relative to the support 2 of this pendular body 3.

According to the first exemplary implementation, described with reference to FIGS. 2 to 6, this axial gripping is exerted via an elastically-deformable washer 25. A single elastically-deformable washer 25 is, here, mounted on a rolling member 11. This rolling member 11 then has two axial end faces 27 of different form, as can be seen in FIG. 3. One of these axial end faces 27 is, here, hollowed out so as to define a housing 30 accommodating the elastically-deformable washer 25, while the other axial end face 27 of the rolling member 11 is convex, exhibiting a protuberance 28 coming to bear axially against the pendular mass 5 axially facing this other axial end face 27.

In this example, the other axial end face 27 does not accommodate an elastically-deformable washer 25.

The elastically-deformable washer 25 is, in this example, produced in spring alloy steel. The washer 25 can be deformed in a plane at right angles to the axis Y according to the arrows of FIG. 5 upon its placement in the housing 30, so as to be held in this housing 30 once it has reverted to its initial form.

According to the four variants of washer 25 represented in FIGS. 2, 4, 5 and 6, the elastically-deformable washer 25 comprises:
- a radially outer annular portion 35 extending circumferentially, and
- at least one lug 37 extending from the radially outer annular portion 35 toward the interior of the washer and protruding axially relative to this radially outer annular portion 35.

In the examples of FIGS. 2, 4 and 5, the radially outer annular portion 35 extends discontinuously, being slotted. As can be seen, different values of circumferential extent α of the slot 40 are possible. In the example of FIG. 2, the slot 40 extends over an angle α measured between its two ends from the center of the outer annular portion 35 of the washer 25 which is very small, lying for example between 10° and 40°. As a variant, the slot can be formed over a greater angle, for example over an angle α of the order of 80°, as represented in FIG. 4.

In the examples of FIGS. 2 and 4, the lug 37 is substantially rectilinear and its free end 41 is facing the slot 40.

In the example of FIG. 5, the slot 40 is defined between two returns extending toward the interior of the elastically-deformable washer 25 from the radially outer annular portion 35, each of these returns then defining a lug 37.

In the example of FIG. 6, the radially outer portion 35 of the washer 25 extends continuously, having no slot. The elastically-deformable washer 25 is, for example, then a Belleville washer.

In each of the examples described with reference to FIGS. 2 to 6, the lug or lugs 37 borne by a rolling member 11 come into axial elastic bearing against a pendular mass 5 of the pendular body 3, so as to exert an axial gripping on this pendular body 3.

There now follows a description with reference to FIG. 7 of a second exemplary implementation of the invention. In this example, a through-housing 50 is formed in each rolling member 11, between the two axial end faces 27 of this rolling member 11. This housing 50 receives a spring 51 of which each end 52 protrudes axially out of the housing 50. Each end 52 of the spring 51 forms, according to this second exemplary implementation, an axial-bearing elastic element bearing axially on a pendular mass 5 of the pendular body 3, making it possible to exert an axial gripping on this pendular body 3.

In all the above, the axial gripping can be exerted on the pendular body for any position thereof relative to the support 2, that is to say that there is then no range of movement of this pendular body 3 relative to the support 2 in which no axial gripping is exerted by the rolling members 11 guiding the movement of this pendular body 3 over the latter. In all the above, the axial gripping can be of constant value. As a variant, the value of the axial gripping can vary during the movement of the pendular body 3 relative to the support 2.

As a variant, the axial gripping is exerted on the pendular body only in certain positions of the pendular body 3 relative to the support, that is to say that there are one or more ranges of movement in which no axial gripping is exerted by the rolling members 11 guiding the movement relative to the support 2 of this pendular body 3.

In all the above, the overall gripping force, expressed in Newtons, exerted by all the rolling members guiding the movement of a pendular body relative to the support can lie between 20% and 110% of the weight, expressed in Newtons, of this pendular body. Preferably, this gripping force lies between 50% and 90% of the weight of the pendular body, in particular lies between 60% and 80% of this weight. To obtain such a gripping force, it is possible to act on the value of the friction coefficient involved in this gripping.

The invention is not limited to the examples which have just been described.

For example, according to the first exemplary implementation, the washer 25 may not be entirely elastically deformable, only the lug 37 or only the lugs 37 exhibiting this elastically-deformable character.

Figure 8:
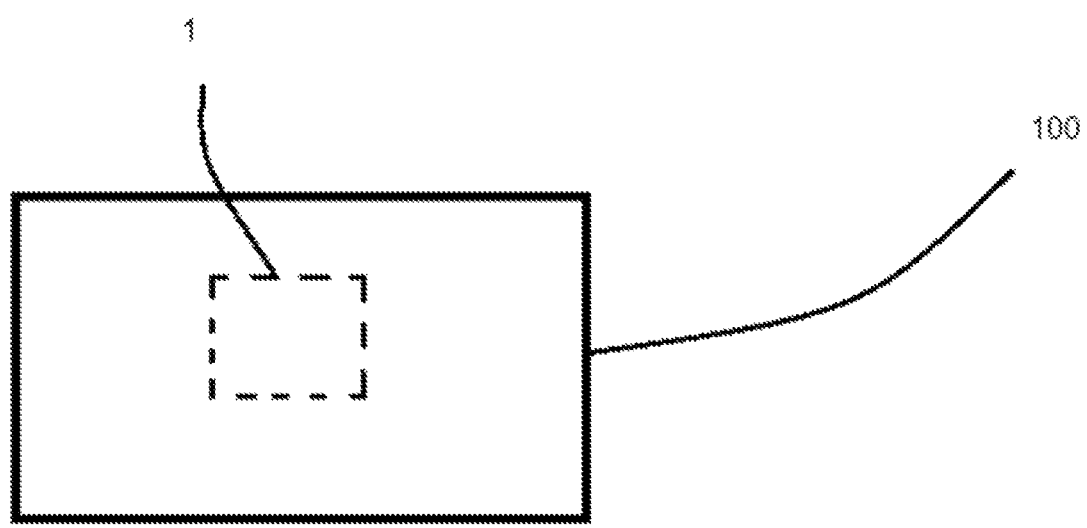
FIG. 8 illustrates a component including the pendular damping device.

Further, FIG. 8 illustrates a component 100 that includes the pendular damping device 1 described above. The component 100 can be any one of the double damping flywheel, the hydrodynamic torque converter, or the friction clutch disk described above.

The invention claimed is:

1. A pendular damping device, comprising:
a support that moves rotationally about an axis,
a pendular body including (1) a first pendular mass and a second pendular mass spaced apart axially relative to one another and movable relative to the support, the first pendular mass being arranged axially on a first side of the support and the second pendular mass being arranged axially on a second side of the support, and (2) a link member that links the first and the second pendular masses to pair the first and second pendular masses, wherein the link member is rigidly fastened to each of the first pendular mass and the second pendular mass; and
a rolling member that guides movement of the pendular body relative to the support, the rolling member cooperating with a first rolling track integral to the support and with a second rolling track integral to the pendular body and defined by the link member,
wherein the rolling member exerts an axial gripping force on one pendular mass of the first and second pendular masses during the movement of the one pendular mass relative to the support,
wherein the rolling member bears, on an axial end face, an axial-bearing elastic element exerting the axial gripping force on the one pendular mass.

2. The device as claimed in claim 1, wherein the rolling member exerts the axial gripping force on each of the first and second pendular masses of the pendular body during the movement of the pendular body relative to the support.

3. The device as claimed in claim 1, further comprising a washer mounted on the axial end face of the rolling member, the axial-bearing elastic element being formed by at least one lug of the washer.

4. The device as claimed in claim 3, further the washer is elastically deformable, so as to allow the washer to be fitted in a housing formed in the axial end face of the rolling member.

5. The device as claimed in claim 4, wherein the washer comprises a radially outer annular portion extending circumferentially from which the at least one lug extends toward the interior of the washer.

6. The device as claimed in claim 5, wherein the radially outer annular portion of the washer being is slotted.

7. The device as claimed in claim 3, wherein the rolling member is hollow so as to define a housing in which a spring is received, at least one of the ends of the spring forming the axial-bearing elastic element.

8. The device as claimed in claim 7, wherein the housing formed in the rolling member is a through-housing, such that each end of the spring received in this the housing forms the axial-bearing elastic element bearing axially on one of the respective pendular masses of the pendular body.

9. A component for a transmission system of a motor vehicle, the component being a double damping flywheel, a hydrodynamic torque converter, or a friction clutch disk, and comprising the pendular damping device as claimed in claim 1.

* * * * *